United States Patent [19]

McMillan

[11] 3,863,844
[45] Feb. 4, 1975

[54] AUTOMATIC FIRE NOZZLE WITH AUTOMATIC CONTROL OF PRESSURE AND INTERNAL TURBULENCE COMBINED WITH MANUAL CONTROL OF VARIABLE FLOW AND SHAPE OF STREAM PRODUCED

[75] Inventor: Clyde H. McMillan, Hobart, Ind.
[73] Assignee: Fire Task Force Innovations, Inc., Hobart, Ind.
[22] Filed: May 2, 1973
[21] Appl. No.: 356,567

[52] U.S. Cl. ............... 239/452, 239/458, 239/459, 239/570, 239/590.5
[51] Int. Cl. .............................. B05b 1/32
[58] Field of Search .......... 239/452, 453, 459, 570, 239/574, 458, 583, 461, 590.5, 456; 222/567

[56] References Cited
UNITED STATES PATENTS

| | | | |
|---|---|---|---|
| 807,025 | 12/1905 | Henry, Jr. | 239/456 |
| 2,432,641 | 12/1947 | Wilson | 222/567 |
| 2,583,233 | 1/1952 | Russell | 239/452 X |
| 2,806,741 | 9/1957 | Fishelson et al. | 239/583 X |
| 2,955,766 | 10/1960 | Nielsen | 239/458 X |
| 3,012,733 | 12/1961 | Allenbaugh, Jr. | 239/458 |
| 3,061,199 | 10/1962 | Billeter | 239/452 X |
| 3,116,018 | 12/1963 | Kunz | 239/458 |
| 3,540,657 | 11/1970 | Thompson | 239/460 X |
| 3,684,192 | 8/1972 | McMillan | 239/452 |

Primary Examiner—M. Henson Wood, Jr.
Assistant Examiner—Andres Kashnikow
Attorney, Agent, or Firm—Merriam, Marshall, Shapiro & Klose

[57] ABSTRACT

A variable flow fire nozzle is provided with a throttling device, automatic turbulence control to cancel the adverse effects of throttling, and automatic pressure control device to maintain essentially constant nozzle pressure. The nozzle further includes provides an arrangement for manual override of pressure control, and debris flushing capability, as well as unique features of construction.

17 Claims, 4 Drawing Figures

AUTOMATIC FIRE NOZZLE WITH AUTOMATIC CONTROL OF PRESSURE AND INTERNAL TURBULENCE COMBINED WITH MANUAL CONTROL OF VARIABLE FLOW AND SHAPE OF STREAM PRODUCED

BACKGROUND OF THE INVENTION

The present invention concerns an improved nozzle. In general, it relates to an automatic, constant pressure, variable flow nozzle. More particularly, it concerns an improved nozzle working in harmony with a valve for throttling the fluid flow entering the nozzle, including a variably restricted and shaped waterway and fins or vanes for controlling the turbulence created by the throttling. A manual override is provided so that the nozzle may, if desired, be adjusted by hand and may be easily cleared, if it becomes clogged with debris.

Heretofore, various types of nozzles have been employed in combination with other firefighting equipment to supply water for fighting fires. Variations or changes in the water supply conditions or fire conditions encountered in fighting fires have presented problems in proper nozzle selection. The water supply available for fighting one fire may be materially different from the water supply available for fighting another fire. For example, in some instances an ample amount of water under sufficient pressure is available and is frequently supplied at excessive nozzle pressure. In other instances only a very limited amount of water may be available, in which case it may be impossible to obtain adequate nozzle pressures. In addition, changes in the water supply available for use often occur during the course of fighting any particular fire. These latter changes may be caused, for example, by the use of additional fire fighting streams or by equipment malfunctions such as pump failure, hose breakage, etc.

It is important that the nozzles employed with fire fighting equipment be capable of providing satisfactory streams of water even under varying or changing water supply conditions. Moreover, it is highly desirable that such nozzles do so automatically, i.e., without the necessity for manual pressure adjustment by an operator. Nozzles which do not require manual pressure adjustment by an operator are particularly desirable since such nozzles obviate problems created by operator error caused by such conditions as inadequate or incorrect information, poor visibility, etc. One such automatic fire nozzle is disclosed in U.S. Pat. No. 3,684,192 issued to this inventor on Aug. 15, 1972.

Current firefighting practice involves moving large quantities of water through various size hoses and waterways involving large energy losses, commonly called "friction losses". Ideally the correct quantities of water are supplied to nozzles of appropriate sizes to develop desired nozzle exit velocities (nozzle pressures) in turn to project streams of water for required reach, penetration, and dispersion sufficient to accomplish the desired fire extinguishing effect.

Numerous variables are inherent to such systems, such as available water supply and whether at rest or under pressure as with a fire hydrant, pressure and volume capabilities of the pump, number and size of fire streams pumped, size of the hoses and waterways to the individual streams, and types and sizes of nozzles used thereon to achieve the required streams.

The fire itself introduces further variables such as the volume and type of material burning, area or size involved, and the relative difficulty of reaching the seat of the fire due to physical arrangement of surroundings. Differences in elevation between source and nozzle, and weather, especially wind and temperature, introduce further variables. The physical limitations and number of men operating streams also enter as important variables. Water friction reducing additives recently introduced, and introduction of larger size hoses further complicate the hydraulic problems by several times over. Most of the variables, where calculable at all, vary by squares or square roots or in ratio thereof, making accurate field calculations impractical at best, and for the most part, impossible.

It has traditionally been considered the responsibility of the fire pump operator to attempt solution of these complex problems by varying the pump pressure, yet the operator seldom has sufficient information upon which to base calculations. Furthermore, most determining factors such as flow requirements, hose layouts and lengths, number of streams and nozzle sizes are determined by supervising officers, frequently without regard for supply and related hydraulic variables. In actuality the pump operator normally provides what he can, if supply streams, short, or when supply is adequate, pumps to an excess based on various "rules of thumb". However, the degree of excess may result in excess water damage, causes undue wear and tear on equipment, which may result in failure of the equipment, and may have a profound effect on nozzlemen on uncertain footing, resulting in undue hazard and frequently in injury.

Any attempt to throttle the flow of fluid at the nozzle by use of a nozzle shutoff valve, other than by placing such valve in a full on or full off position, results in an extremely turbulent flow within the nozzle body causing the stream to "burst" and feather as it exits the nozzle, and drastically reduces the nozzle pressure and exit velocity and, consequently, the effectiveness of the stream. If it were possible to utilize a shutoff valve in a partially open position, thus to throttle somewhat the exit stream, it would be possible for the nozzleman to control the amount of water exiting from the nozzle to meet the exigencies of any situation that he observes. Therefore, the need is great for a generally automatic pressure regulating nozzle which also permits rapid, efficient, manual flow adjustment at the nozzle.

In addition to the aforementioned problems, another problem with fog nozzles of the prior art is the fact that they frequently have had a tendency to become clogged by bits of foreign matter such as rust, scale, and pebbles commonly present in the water flow. Furthermore it is essential that manual means be provided for overriding automatic pressure regulation when various circumstances occur such as when normal operating pressure is impossible to achieve.

SUMMARY OF THE INVENTION

The present invention uses dual movable baffles for automatic adjustment of nozzle pressure and turbulence control. Fluid entering the nozzle actuates the dual baffle piston to permit the fluid to exit the nozzle in such a manner that the pressure within the nozzle is maintained at a substantially constant level.

Means for throttling the supply of fluid entering the nozzle are provided either as an integral part of the nozzle or separately. These throttling means may take the form of a ball valve, a butterfly valve, a gate valve, or any other suitable valve means. Since throttling the fluid stream causes extreme turbulence downstream from the throttling means, the inside of the nozzle body incorporates a restriction, preferably variable with flow, and is specially shaped to assist conventional fins or vanes in producing a profound straightening effect, virtually eliminating all the turbulent effect caused by the throttling means, such that the flow exiting the nozzle mouth is quite aligned.

The outer baffle of the dual baffle piston of the present invention is threadably connected to its supportive shaft in order that the outer baffle may be unscrewed and manually positioned both to provide a manual override adjustment when necessary and to remove debris when it becomes necessary to clear the nozzle.

Use of the present invention considerably reduces the problems associated with prior art nozzles. The fire fighting nozzle herein described reduces the function of the pump to that of merely providing a constant high pressure source within the capacity of the pump or limitation of the water supply. Use of nozzles in accordance with the present invention assures the production of optimum fire fighting streams automatically, in keeping with all conditions and limitations by placing functional control of stream characteristics in the hands of the nozzlemen. By a combination of various devices currently available, the supplying pumper can be automated such that a pump operator in constant attendance is no longer required.

The nozzle combines automatic nozzle pressure control with means for control of turbulence within the nozzle such that a nozzle shutoff valve, i.e., throttling means, may be positioned in intermediate positions up to the full capacity of the system by the nozzleman to select and control the quantity of flow leaving the nozzle, but without injurious effect on either the stream shape or pressure. In essence, the turbulence control features cancel the turbulence created by the throttling effect of the shutoff valve, while the automatic constant pressure device maintains optimum nozzle pressure, and thereby exit velocity, thus delivering a clean stream or finely divided fog pattern at proper pressure for any selected flow within the capacity of the nozzle and supplying system.

With the present invention complete flow control is possible at the individual nozzles, and thus it becomes practical to operate a pumping engine at a single constant pressure, or at selectable constant pressure levels according to general conditions such as "moderate," "normal," "high" and "emergency." In turn it then becomes practical, with existing pressure governors and other devices with minor modifications, to automate the pumping function.

Furthermore, general usage of such nozzles provides automatic coordination and regulation of all streams from a single pumper — coordination which can be varied at will to provide heavier streams where most effective, while slacking off on streams not requiring as great a volume. The overall consequence is to revise completely the hydraulic technology of fire fighting to a simple, quick, practical, exact, effective and efficient operation. The nozzles of the present invention have a variable operating capacity of from approximately 50 to 350 gallons per minute, i.e., in essence from the smallest to the largest flows normally used by nozzlemen with hand held hose lines (excluding smaller booster and extinguisher type appliances).

In the past it has been necessary for the fire company officer to judge the extent and rate of progression of a fire and select a size (flow capacity) of the stream to be used to fight it. If his estimation proved to be inadequate, the fire continued to increase in size, resulting in greater fire loss. On the other hand, if he overestimated (as was the intended normal practice), the fire would be quickly controlled, but with excessive water damage. The variable flow nozzle herein described permits exact selection of required flow according to the situation moment by moment up to the maximum available from the supplying system, yet will generally serve to minimize water damage.

The flexible control of water usage provided by the present invention has particular merit when the water is supplied from mobile tanks, permitting maximum conservation of water when the situation requires only minimal flow, yet providing maximum performance should the situation suddenly worsen.

Other features and advantages of the present invention as disclosed and claimed herein will become apparent to those skilled in the art from the following detailed description in connection with the accompanying diagrammatic drawings.

DETAILED DESCRIPTION OF THE INVENTION

In all Figs. fluid flow is from left to right, and the exit (or right end) is termed the "forward" or "downstream" end. Conversely, the entrance (left), or attaching end is referred to as the "rear" or "upstream" end.

Figure 1:
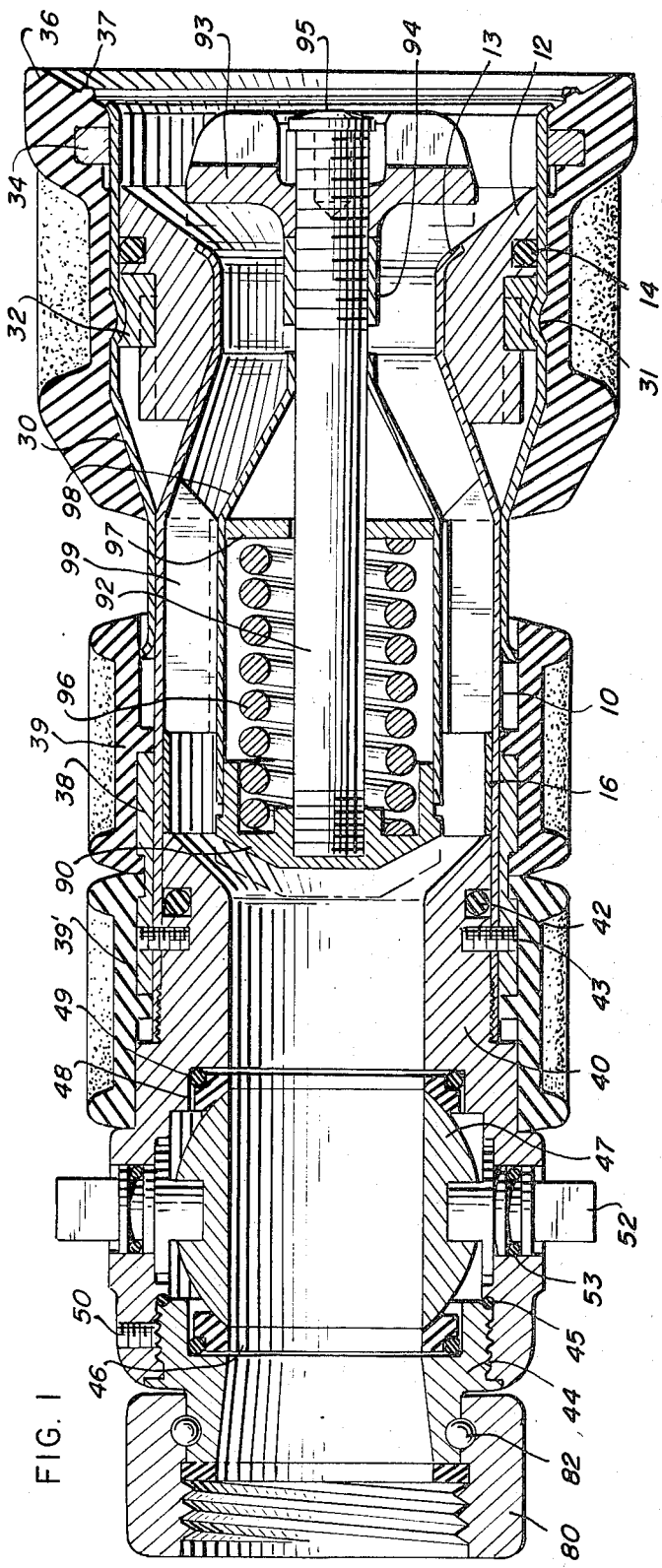
FIG. 1 is a longitudinal sectional view of a nozzle in accordance with the present invention showing an integral flow control and shutoff valve.

Referring to FIG. 1, the basic frame member is a nozzle body or barrel 10 consisting of a tube whose interior surface is shaped to form the desired waterway contour, which is described below. Encircling the reduced diameter of a barrel 10 at its downstream end is barrel cone threaded ring 12, which is attached to barrel 10 by an outward flare 13 upon the downstream end of barrel 10. Barrel cone O-ring 14 and barrel spacer 16 serve to space and seal the members as described below.

Encircling and longitudinally movable on barrel 10 is stream shaper sleeve 30 constructed of spun tubing within which is disposed a sleeve thread ring 32 affixed within sleeve 30 by a rolled groove 31. The function of thread ring 32 is to mate with the threads of barrel cone thread ring 12 thereby to provide means for longitudinal threadable adjustment of shaper sleeve 30 in relation to barrel cone 12. Encircling shaper sleeve 30 is a press fitted reinforcing ring 34, which also serves to locate a protective encircling elastomeric bumper 36 having projections 37 on the forward face thereof. Forward travel (to the right in the Figs.) of the shaper sleeve assembly 30 is limited by end contact of the mating thread rings 32 and rear travel is limited by engagement of the shaper sleeve assembly 30 with the peripheral, encircling abutting protective elastomeric grips 39, 39' which comprise two identical pieces mounted back to back.

With further reference to FIG. 1, valve base 40 enters barrel 10 from the rear (left) and includes and O-ring base seal 42 to block undesired fluid flow. Base 40 is attached to barrel 10 by threads, pins or other suitable means and locked by base set screws 43, which also serve to locate and lock grip ring 38. Base thread ring 44 is threadably entered in the rear of valve base 40 and sealed by thread ring O-ring 45, thereby defining a ball valve chamber 46 in which is located valve ball 47, ball seals 48, and seal O-rings 49.

Base thread ring 44 is prevented from rotating (unthreading) in valve base 40 by set screw 50. Valve ball 47 is rotationally actuated by trunnions 52, operating through appropriate holes in valve base 40 and sealed by trunnion O-rings 53. Trunnions 52 are actuated by a suitable handle (not shown).

Figure 2:
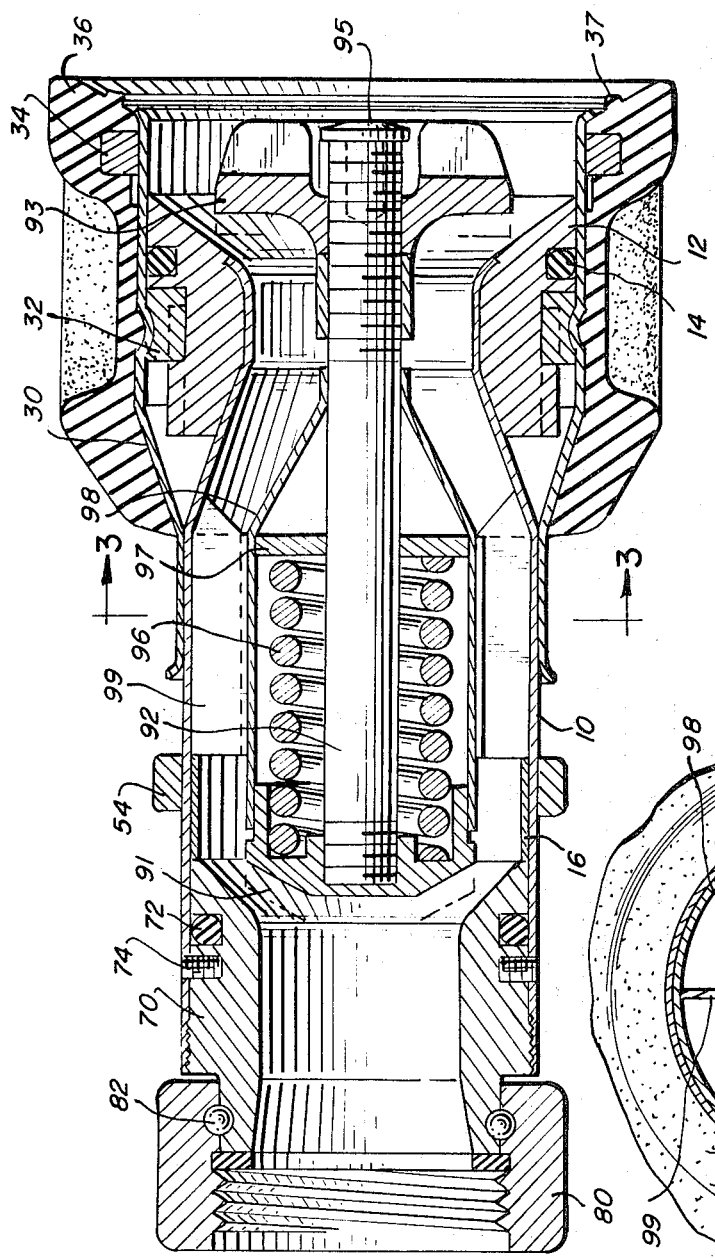
FIG. 2 is a similar view of an alternate embodiment of the present invention, which is adapted for attachment to a user's existing shutoff valve.

FIG. 2, showing an alternate embodiment of the present invention, is in essence identical to the above except that the valve parts described above are replaced by base 70 with associated base seal 72 and locking set screws 74. Since this embodiment is designed to be attached to an existing shutoff valve, stop ring 54 is attached to the circumference of barrel 10 for the purpose of limiting rearward travel of shaper sleeve 30. In either of the embodiments depicted in FIG. 1 or FIG. 2, however, a thread swivel 80 is mounted by means of swivel balls 82 to either valve base thread ring 44 or base 70. Thread swivel 80 provides for connection to hose line, adapter, play pipe, or shutoff, as may be desired for various operational situations.

Within the nozzle body is the mechanism or control means for automatically adjusting the pressure within the nozzle. These control regulator means comprise a movable inner piston 90 threadably attached to a shaft 92. On the opposite or forward end of shaft 92 is a threadably attached outer baffle 93 and a baffle spacer 94. Accidental removal of outer baffle 93 from shaft 92 is prevented by a locking device, here shown as locking screw 95. Movement of piston 90 and attached parts is resisted by a coil spring 96 which abutts on its forward end against a washer 97, in turn abutting against the forward tapered surface of the spring container 98.

Figure 3:
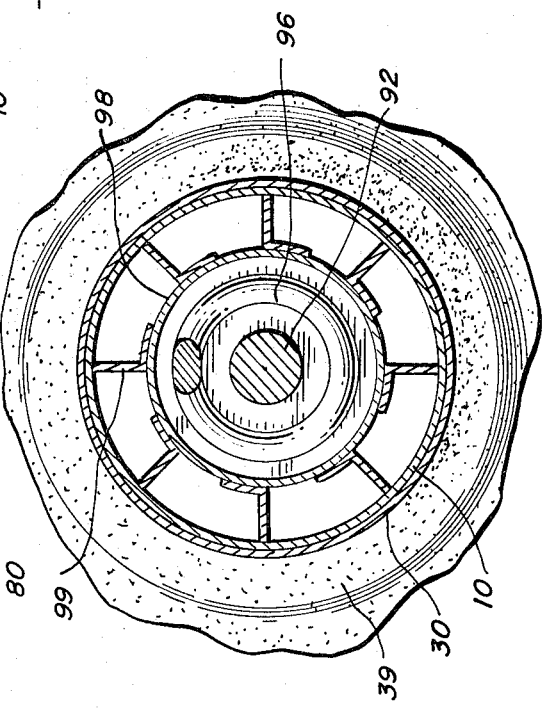
FIG. 3 is a cross sectional view taken along line 3—3 of FIGS. 1 or 2.

FIG. 3, a cross sectional view through the section wherein spring container 98 is located, shows a series of radial fins or vanes 99 attached to and which support and axially locate the position of spring container 98 and associated mechanism. Longitudinal restraint and positioning of the supporting fins 99 is accomplished by spacer 16.

Figure 4:
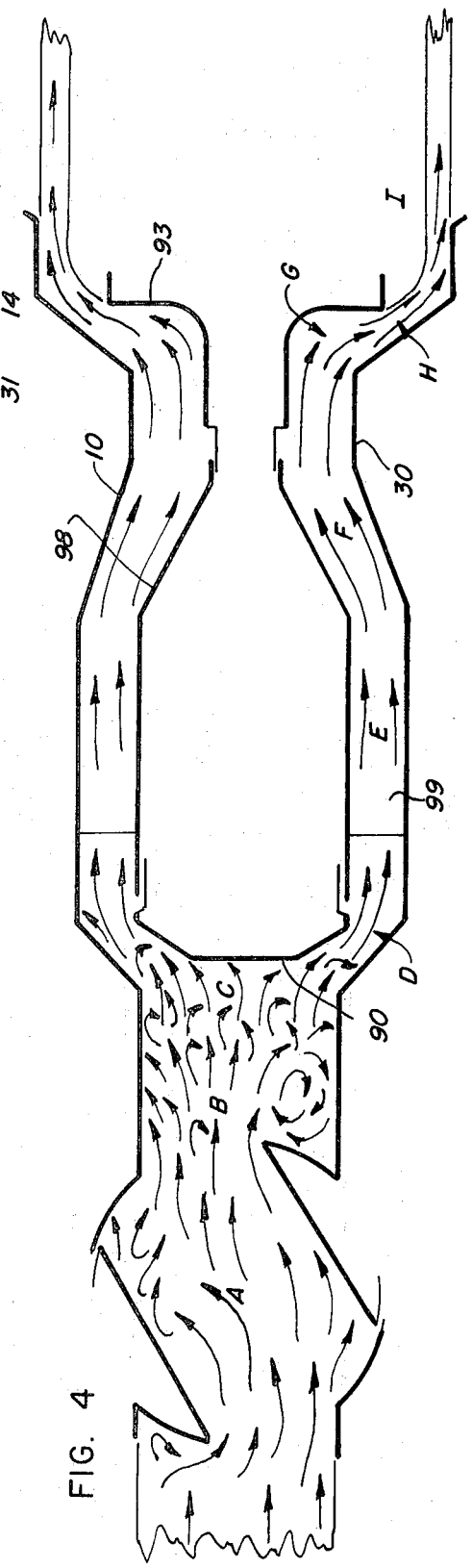
FIG. 4 is a longitudinal sectional view similar to FIG. 1 schematically showing the path of fluid through the nozzle with approximation of turbulence patterns therein at part opening of the throttling valve.

FIG. 4 illustrates the essential flow features associated with the various areas of the nozzle waterway. A represents flow through a partially open ball valve, showing an approximation of flow lines and turbulent vorticies created at area B. Area C shows fluid acting against piston 90 and being radially distributed through a metering restriction at D. With the exception of the position of the ball valve in area A, all downstream areas (to the right) are symmetrically circular in cross section. Area E is the area of the fluid flow straightening vanes 99, while area F is a section flowing fluid radially inward into area G acting on outer baffle 93. Pressurized fluid exits the nozzle at restricted metering area H in an outward conical configuration, whereas at area I it is acted upon by longitudinally movable shaper sleeve 30 to shape or choke the fluid to any angle of conical pattern varying from a wide cone to a tight, straight stream.

The functioning of the present invention may best be understood by dividing it into the four primary functions it is intended to accomplish: flow or volume control; turbulence control; pressure control; and shape control. Considering each function in turn, with continued reference to the flow diagram of FIG. 4; volume control is accomplished by the throttling action of a valve at A such as a ball valve or any other valve type such as a gate or butterfly valve. The result of the throttling action, irrespective of the type of valve used, is to create a violent turbulence downstream of the valve. In nozzles heretofore available such turbulence effectively destroyed the continuity and cohesiveness of any stream from the nozzle.

Nozzles in accordance with the present invention provide contraction and expansion of the flow area through suitable (preferably variable) restrictions, as at areas D and H, and radial variations in circular size and area, as between E, F, G, and H, along with straightening vanes in area E to produce a profound straightening effect, virtually eliminating all turbulent effects from the valve such that the flow exiting the pressurized portion of the nozzle at H is most desirably aligned.

Turbulent flow in area B, moving at high velocity toward the right, is radially distributed at area C by the movable face of piston 90, and flows outward through the first restriction D, the annular opening of which is controlled by the movement of the pressure control mechanism of the piston in relation to the adjacent body waterway surface. High velocity flow is then aligned longitudinally by the inner surface of barrel 10 and thereby directed and slowed through flow straightening vanes 99. Thereafter, the flow is directed radially inward and due to the contour of barrel 10, then directed outward by the outer beffle 93 to a final variable accelerating annular restriction at H, exiting at very high velocity in a conical configuration free of deleterous turbulence.

Constant pressure control is provided by varying the exit flow area at H by means of variable positioning of outer baffle 93. The hydraulic forces, including pressure and velocity, bearing upon the exposed faces of piston 90 and baffle 93 are balanced by control spring 96 acting between abutment washer 97 and piston 90, which is connected to baffle 93 by shaft 92. As pressure within the nozzle tends to exceed the desired constant pressure, such as by an increase in the flow caused by a further opening of the throttling valve, baffle 93 opens toward the right, providing a greater flow area to pass the increased flow at essentially constant pressure. Conversely, if flow is diminished as by throttling or otherwise diminishing the supply, baffle 93 closes toward the left, reducing the flow opening, thereby maintaining an essentially constant pressure.

It will be noted that baffle piston 90 via shaft 92 moves in harmony with outer baffle 93 to vary the first turbulence controlling restriction at D, and that the combination of elements 90, 92 and 93 comprise a dual piston baffle. Inspection of the Figs., will reveal minimum and maximum opening stops at spacer 94 and piston 90 limiting travel of the movable portion of the mechanism. The restriction at D is large enough even at minimum opening to pass sizable debris, and increases in size as flow is increased, thereby to pass still larger debris.

Outer baffle 93 is threadably attached to shaft 92 in such a fashion that it may be manually positioned for either of two purposes, yet cannot be accidently removed due to the presence of locking screw 95. One desirable purpose is to permit the baffle to be manually fully opened quickly (with the nozzle shut off) to permit dumping and/or flushing of entrapped debris, after which the baffle may then be quickly restored to normal operating position. Another desirable, and indeed critical, function is to provide manual override of the automatic pressure regulation when abnormal circumstances (such as breakdown of the pumping engine) result in inadequate pressure being supplied to the nozzle for normal operation. In such adverse circumstances a nozzleman may protect himself by manually opening the baffle 93 a turn or two thereby to obtain an increased volume at whatever pressure may be available from a supplying fire hydrant. Thus, the nozzleman may manually obtain the best possible comprise stream to cover escape, or if his position is tenable, until normal operating pressure is restored, in which case the shutoff valve is momentarily closed to permit rescrewing the baffle 93 to its normal operating position.

Movable shaper sleeve 30 serves to choke the flow into a tight straight stream when in the extended position, as shown, or when retracted permits divergence in a finely divided "fog" pattern, the width and range of which varies according to the degree of retraction. In the wider fog positions the flow impinges upon elastomeric projections 37 molded integrally into the forward face of protective elastomeric bumper 36, thereby to provide a necessary disruption for the finer break-up of the "fog" pattern, and to direct a part of the flow towards the center of the fog cone, thereby filling the cone with water spray.

The interior parts of the nozzle are preferably machined from hardened aluminum alloy, suitably hard coated. The exterior parts, spring, and spring chamber are preferably made from stainless steel. Such materials combine greatest strength while maintaining lightest weight. The parts are also preferably coated or impregnated with a friction reducing material, e.g., Teflon. Other materials, of course, may also be used. These nozzles are designed to operate in the range from about 50-350 gallons per minute, at an effective nozzle exit pressure of approximately 90 psi, although other flow ranges or operating pressures may be readily achieved with minor changes.

The foregoing detailed description has been given for clearness of understanding only, and no unnecessary limitations are to be understood therefrom, as modifications will be obvious to those skilled in the art. For example, instead of the coil spring shown as part of the pressure control means, hydraulic control means or spring-like (elastomeric) materials could be used in place of, or to assist the coil spring. Also, pneumatic air-spring devices can be used in the pressure control means. Similarly, manual override could be provided by retracting the adjacent conical surface, or otherwise manually varying the spacing between the baffle and cone, as by a cam or detent. Further variations might include: variation in profile of components, or combination of separate components into single parts, or conversely, division of single components into multiple parts; variations by elimination of one or more of the functions, or components pertinent to the various functions; or use with fluids other than water, or for purposes other than fire-fighting.

What is claimed is:

1. A nozzle body for regulated discharging of a fluid with an automatic pressure controlling mechanism axially and reciprocably mounted therein, and said pressure controlling mechanism having a piston head constructed and positioned in the path of fluid flow and cooperating with a surrounding portion of the nozzle body to form a variable size first annular opening for the passage of fluid, and said pressure controlling mechanism also having a control baffle cooperating with a surrounding conical portion of the nozzle body to form a variable size second annular opening for the discharge of fluid, wherein said control baffle is mounted on a shaft is adapted to be manually positioned in relation to an adjacent conical surface for purposes of flushing or manually overriding of automatic pressure control.

2. A nozzle comprising:
   a nozzle body providing a housing for an internal axially reciprocable fluid regulator unit having a movable baffle and piston constructed to move together, and said regulator being adapted to adjust automatically the position of said baffle and piston with respect to said nozzle body in response to both fluid quantity and pressure supplied said nozzle to thereby maintain nozzle pressure at a substantially constant level;
   said nozzle also including fluid flow control metering means adjacent and surrounding both the baffle and the piston and cooperative with said baffle and piston to form annular passages for regulating said fluid supplied said nozzle; and means for removing turbulence from said fluid and including flow straightening means positioned downstream from said piston and constructed to extend axially and radially of said nozzle body.

3. The nozzle as claimed in claim 2 wherein said internal means for regulating said fluid comprise:
   an internal, preferably variable, restriction for primary distribution and control of turbulent flow;
   means for directing the flow path out, in, and out, while alternately speeding and slowing fluid velocity, thereby to destroy primary turbulence;
   fins radially disposed within said nozzle body;
   means for shaping said fluid supplied said nozzle, said shaping means disposed within said nozzle body; and,
   means for supporting and holding said fins in said radial disposition.

4. The nozzle as claimed in claim 2 and throttling means comprising a ball valve means being associated with the nozzle.

5. The nozzle of claim 2 wherein said baffle and said piston are mounted on a shaft for movement in unison.

6. The nozzle of claim 2 wherein said baffle includes adjustment means adapting said baffle for manual movement along said shaft.

7. A nozzle comprising a nozzle body with a fluid regulator mounted therein for axial reciprocal movement for automatic pressure control of fluid flow to thereby assist in turbulence control, and, said fluid regulator having interconnected piston means and baffle means adapted to automatically adjust the position of said regulator in relation to said nozzle body in response to fluid quantity and pressure supplied to said nozzle to thereby maintain nozzle pressure at a substantially constant pressure and, fluid control fins extending axially and radially of the nozzle body and having portions surrounding the fluid regulator and being disposed to receive fluid which has passed the piston means of the regulator.

8. The nozzle as claimed in claim 7 wherein said fluid regulator includes a spring providing a biasing force between the nozzle body and the fluid regulator.

9. A nozzle for controlling the discharge of fluid and having an inlet section and an outlet section and providing therebetween a longitudinally extending chamber, and said nozzle having fluid control means being disposed within said chamber and including a baffle portion at the outlet section of the nozzle, the improvement comprising:

said fluid control means including a longitudinally reciprocable fluid regulator mounted within said chamber and including an inner piston head having a face portion facing the inlet section of the nozzle, and said regulator also including said baffle portion adjacent the outlet section of the nozzle and said baffle portion including a fluid contact face adapted to direct fluid flow from the nozzle, and further, said reciprocable fluid regulator including connecting means joining the piston head to the baffle portion thus providing for movement in unison of the piston head and baffle portion in response to fluid forces;

resilient spring means biasing the fluid regulator against the direction of the fluid flow;

said fluid control means within said longitudinally extending cahmber including a first annularly extending fluid control surface surrounding the piston head and cooperating with said piston head to form a first metering passage, and, said fluid regulator also including a second annularly extending fluid control surface surrounding the baffle portion and cooperating with said baffle portion to form a second metering passage whereby fluid forces reciprocating the fluid regulator vary the size of the first and second fluid metering passages.

10. The nozzle as claimed in claim 9 wherein said fluid control means comprises fins radially disposed within said longitudinally extending chamber and include portions adapted to guide fluid after said fluid has passed the piston head of the fluid regulator.

11. The nozzle as claimed in claim 9 wherein said nozzle includes elastomeric grip means encircling the nozzle and also providing protective bumpers for said nozzle.

12. The nozzle of claim 9 wherein the baffle portion of the fluid regulator is constructed to be adjustably mounted on said connecting means to be manually positioned in relation to the adjacent second fluid control surface for purposes of either flushing or manually overriding the automatic operation of the fluid regulator.

13. The nozzle of claim 9 wherein said fluid control means includes a shaper sleeve encircling the outlet section of the nozzle and including means for adjusting the position of the sleeve with respect to the outlet section of the nozzle and said shaper sleeve also having fluid contact portions for modifying the shape of the pattern of discharged fluid.

14. The nozzle of claim 9 wherein said baffle portion is provided with adjustment and locking means for attaching said baffle portion whereby loss or accidental removal of said baffle is prevented and manual adjustment of the baffle may be made.

15. The nozzle of claim 9 wherein said inlet section includes valve means for manually controlling fluid flow.

16. The nozzle of claim 13 and said second fluid control surface forming a portion of a barrel ring encircling the outer baffle and said barrel ring having a forward stop for limiting forward travel of the shaper sleeve.

17. The nozzle of claim 13 wherein elastomeric grip means encircle the shaper sleeve and said shaper sleeve includes a stop portion for limiting rearward movement of said shaper sleeve.

* * * * *

PO-1050
(5/69)

UNITED STATES PATENT OFFICE
CERTIFICATE OF CORRECTION

Patent No.  3,863,844                    Dated   February 4, 1975

Inventor(s)  Clyde H. McMillan

It is certified that error appears in the above-identified patent and that said Letters Patent are hereby corrected as shown below:

Col. 2, Line 24, after supply, delete "streams," insert --is--;
Line 58, after "uses" insert --a piston with--.

Col. 6, Line 40, delete "beffle" insert --baffle--.

Signed and sealed this 29th day of April 1975.

(SEAL)
Attest:

RUTH C. MASON
Attesting Officer

C. MARSHALL DANN
Commissioner of Patents
and Trademarks